Sept. 1, 1964 W. WEZEL 3,146,576
METHOD OF MAKING HOLLOW FLEXIBLE SHAFTING
Filed July 20, 1960
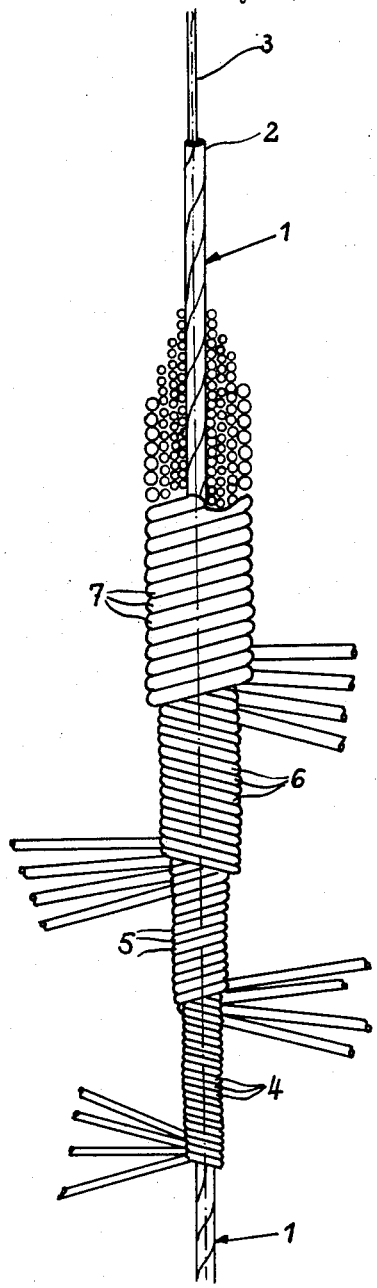
INVENTOR.
Walter Wezel
BY
Michael S. Striker
Attorney

3,146,576
METHOD OF MAKING HOLLOW FLEXIBLE SHAFTING
Walter Wezel, 14 Oetisheimer Weg, Maulbronn, Wurttemberg, Germany
Filed July 20, 1960, Ser. No. 44,214
Claims priority, application, Germany, July 25, 1959, Sch 26,424
5 Claims. (Cl. 57—160)

This invention relates to flexible shafts of the kind comprising an untwisted inner mandrel surrounded by one or more single-start or multiple-start helical metal wire windings, the windings being alternately of right-hand twist and left-hand twist when more than one winding is present.

In known shafts of the kind referred to, the inner mandrel consists of steel wire on which the innermost layers of the covering wires are so wound that they lie tight against one another and on one another. Insofar as these shafts are made in small quantities by hand, the mandrels can be withdrawn after the production of the individual shafts so that in the interior of the shaft there results a small space. Such hollow shafts have the advantage that upon bending the inner wire layers, particularly at high speeds of rotation, they can work together resiliently.

With flexible shafts which are produced by fully automatic methods and are supplied in large quantities the withdrawal of the inner mandrels causes difficulties, because the innermost layer of wire is pressed tightly on the mandrel. Such flexible shafts have a substantial stiffness and consequently cannot be used for all purposes.

The invention is therefore intended to solve the problem of providing a flexible shaft of the kind referred to which can be produced by fully automatic methods and which is supple and can be used for all purposes. This problem is solved according to the invention in that the inner mandrel consists at least partly of a non-metallic material, for example of synthetic resin or paper tape or the like. In some instances the inner mandrel may consist of a metal wire with a covering of the non-metallic material.

The invention offers the advantage that the flexible shafts can be produced fully automatically and nevertheless are as flexible as shafts which are hollow and are made by hand.

The flexibility of the shafts may be further increased according to a further feature of the invention in that the non-metallic part of the inner mandrel may be destroyed or made to shrink by the action of heat or by chemical means. With embodiments in which the inner mandrel comprises a core of metal wire, the latter may remain loose in the space in the hollow shaft. Obviously the metal wire may, like the merely shrunken inner mandrel, be subsequently withdrawn out of the completed shaft.

The invention is illustrated by way of example in the accompanying drawing, which shows partly diagrammatically and partly in section a part of a flexible shaft being manufactured according to the invention.

Referring to the drawing, the illustrated flexible shaft comprises an inner mandrel 1 which consists of a non-metallic material such as, for example, synthetic resin or polymer or paper tape or the like. In some instances this non-metallic material may be provided as a coating 2 on a metal wire 3.

On the inner mandrel 1 are wound for example four layers of metal wires 4, 5, 6, 7 in such a way that the innermost layer consisting of the wires 4 is wound directly around the inner mandrel 1. The individual layers of wire are wound tightly one upon another, and the direction of winding alternates from one layer to the next. The individual layers of wire may consist of several, for example four, wires lying tightly beside one another, the diameters of the wires preferably increasing from the innermost to the outermost layer.

I claim:
1. A process of manufacturing hollow flexible shafting, comprising the steps of machine-winding in superimposed layers and in alternating helical directions a plurality of wire coils on a temporary central cylindrical mandrel consisting of non-metallic material destructible by a destroying agent; and thereafter destroying said mandrel by said destroying agent, whereby a hollow flexible shafting of high flexibility is obtained.

2. A process according to claim 1, wherein said mandrel consists of material having a melting point lower than that of said wire coils and said destroying agent comprises heat of sufficient intensity to melt said mandrel out of the shafting but leave the wire coils intact.

3. A process according to claim 1, wherein said mandrel consists of material destructible by heat of an intensity less than the intensity required to destroy said wire coils and said destroying agent comprises heat of sufficient intensity to destroy said mandrel but leave the wire coils intact.

4. A process according to claim 1, wherein said mandrel consists of material destructible by chemical means and said destroying agent comprises chemical means that destroys said mandrel.

5. A method of manufacture of flexible metallic cable comprising the steps of feeding a core strand of organic material of indeterminate length and simultaneously winding multiple metallic strands in each of superposed layers around said core strand and subsequently decomposing said core strand thereby substantially removing the latter from the wound metallic strands to produce a hollow cable.

References Cited in the file of this patent
UNITED STATES PATENTS

| | | |
|---|---|---|
| 158,324 | Starr | Dec. 29, 1874 |
| 786,257 | Beebe | Apr. 4, 1905 |
| 887,160 | Webb | May 12, 1908 |
| 1,843,076 | Angell | Jan. 26, 1932 |
| 1,874,413 | Angell | Aug. 30, 1932 |
| 1,952,301 | Webb | Mar. 27, 1934 |
| 1,999,051 | Kennedy | Apr. 23, 1935 |
| 2,006,333 | Angell et al. | July 2, 1935 |
| 2,142,865 | Zabel | Jan. 3, 1939 |
| 2,387,321 | Haddad | Oct. 23, 1945 |
| 2,993,526 | Young | July 25, 1961 |